United States Patent [19]

Würker

[11] 4,185,134
[45] Jan. 22, 1980

[54] ASSEMBLY FOR ADHESIVELY SPLICING PLIABLE TAPE ENDS

[76] Inventor: Julie Würker, D-7239 Oberndorf-Aistaig, Fed. Rep. of Germany

[21] Appl. No.: 884,734

[22] Filed: Mar. 9, 1978

[51] Int. Cl.[2] .......................... B31F 5/06; B31F 5/08; C09J 7/02; G03D 15/04
[52] U.S. Cl. ...................................... 428/40; 156/157; 428/61; 428/120
[58] Field of Search .......................... 428/40, 61, 120; 156/157

[56] References Cited

U.S. PATENT DOCUMENTS

| 2,969,106 | 1/1961 | Reibel et al. | 156/157 |
| 3,043,188 | 7/1962 | Baia | 156/157 |
| 3,351,514 | 11/1967 | Creigh | 428/61 |
| 3,424,644 | 1/1969 | Nakagome | 428/61 |
| 3,475,263 | 10/1969 | Kapilow et al. | 156/157 |
| 3,573,146 | 3/1971 | Guinan et al. | 428/61 |
| 3,733,240 | 5/1973 | Hanke | 428/61 |
| 3,914,491 | 10/1975 | Takahashi | 156/157 |
| 3,939,026 | 2/1976 | Petry et al. | 428/61 |
| 4,020,842 | 5/1977 | Richman et al. | 428/40 |
| 4,041,201 | 8/1977 | Wurker | 156/157 |

FOREIGN PATENT DOCUMENTS

| 2550259 | 7/1976 | Fed. Rep. of Germany | 156/157 |
| 2622742 | 12/1977 | Fed. Rep. of Germany | 156/157 |

Primary Examiner—J. C. Cannon
Attorney, Agent, or Firm—Roylance, Abrams, Berdo & Farley

[57] ABSTRACT

An assembly for adhesively splicing tape such as magnetic tape includes a carrying strip which is foldable on itself. On the inner surface of one side of the folded strip is an adhesive zone releasably holding a foil which has on its other surface a joining adhesive covered by a releasable covering strip. Alignment holes and other marks are provided. The other side of the folded carrying strip can have an adhesive region for temporarily holding the tape ends during splicing. Two embodiments are disclosed.

9 Claims, 7 Drawing Figures

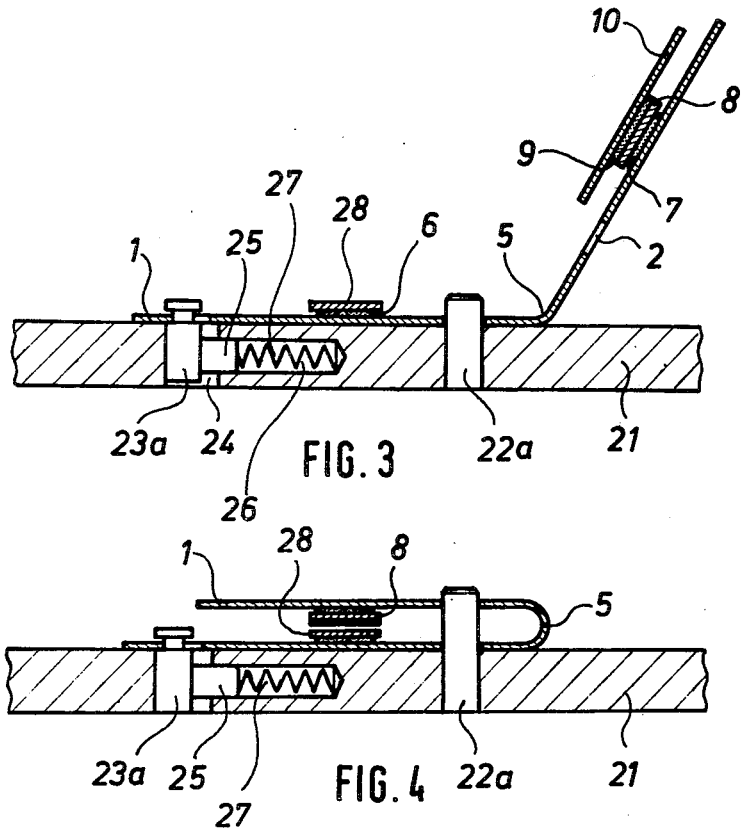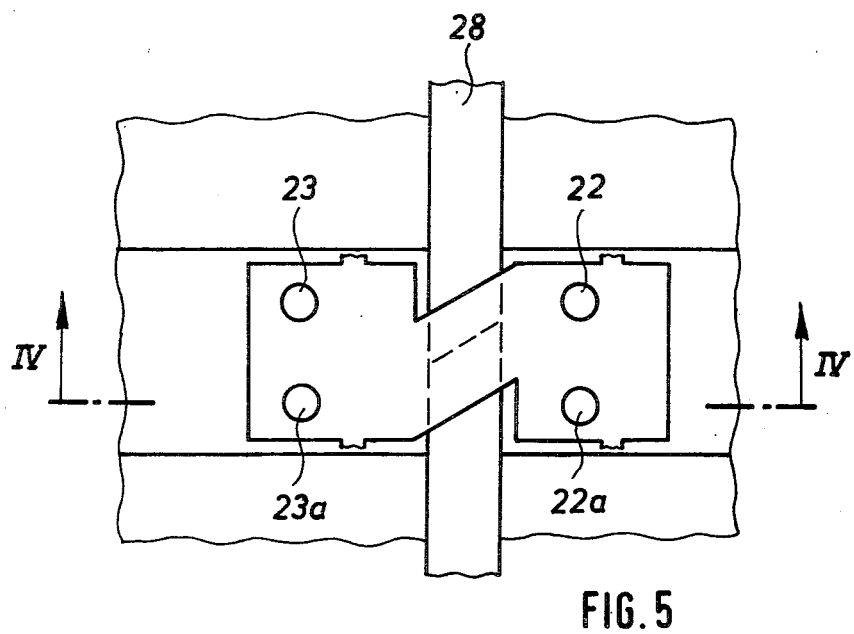

ASSEMBLY FOR ADHESIVELY SPLICING PLIABLE TAPE ENDS

The invention is concerned with adhesive tape fittings corresponding to the specifications of claim 1.

Cutting pieces of adhesive foil off of a tape and pasting them on two ends of the soft and pliable tape that have been pushed together is a familiar process. These ends are usually kept in a groove shaped to correspond to the width of the soft and pliable tape. The groove can be located on a box containing the adhesive foil tape. The adhesive foil can be cemented along the length of the soft and pliable tape or across it. In the latter case, the parts of the adhesive foil projecting over the sides of the soft and pliable tape must be cut off, and usually in the former case, too, since it is often impossible to apply the adhesive foil to the soft and pliable tape so that it covers it exactly. Cutting off the adhesive foil frequently results in undesirable damage to the soft and pliable tape.

The basic task of the present invention is to provide adhesive-tape accessories with which the adhesive foil can easily be applied exactly to the ends of the soft and pliable tape that are to be fastened together. This problem is solved by the invention which includes an adhesive tape assembly for connecting two ends of a soft and pliable tape, and especially a magnetic tape, by means of an adhesive foil carrying a layer of adhesive adhering to it firmly and conforming to the width of the soft and pliable tape, characterized in that the adhesive foil is made as an individual part to cover over the ends of the soft and pliable tape and its layer of adhesive is covered by a covering strip which can be detached from it, that the adhesive foil is fastened to a carrying strip on the side away from the layer of adhesive by a layer of adhesive which can be detached from it, and that the carrying strip has an alignment mark with which the adhesive foil, on the one hand, and the ends of the soft and pliable tape which are to be fastened together, on the other, can be placed on the carrying strip in a specific position in relation to each other. Having the adhesive foil as a separate component saves the trouble of cutting off individual pieces of adhesive foil from an adhesive foil tape. Putting the adhesive foil on a carrying strip in such a way that it can be detached results in easy handling of it. The alignment mark placed on the carrying strip makes it possible to line up the two things with each other exactly—that is, the adhesive foil and the ends of the soft and pliable tape that are to be fastened together, and the latter must not have any special alignment devices such as the series of perforations on a strip of film, for example. The adhesive foil can be cemented to the soft and pliable tape without projecting over the sides.

Fastening the adhesive tape to the ends of the soft and pliable tape that are to be connected to each other is facilitated by providing an assembly wherein the alignment mark is located on the same side of the carrying strip as the adhesive foil and at a distance from it, with a bending location falling between them, and wherein a covering mark is provided to ensure a predetermined covering over of two parts of the carrying strip.

It is also possible to connect individual adhesive tape assemblies in the form of a tape by arranging the carrying strips individually one after the other and fastened to each other by interconnecting crosspieces.

Additional advantages of the invention will be perceived from the other claims, the description and the diagrams. In them, two embodiments of an adhesive tape outfit used to connect two ends of a magnetic tape bearing no special markings are shown schematically as embodiments of the object of the invention.

FIG. 3 is an end elevation in partial section of a device for handling one of the adhesive tape assembly of FIGS. 1 and 2.

FIG. 4 is an end elevation, in partial section, similar to FIG. 3, with a different positioning of parts of the adhesive tape assembly.

FIG. 5 gives a plan view of a part of the device shown in FIGS. 3 and 4.

Figure 6:
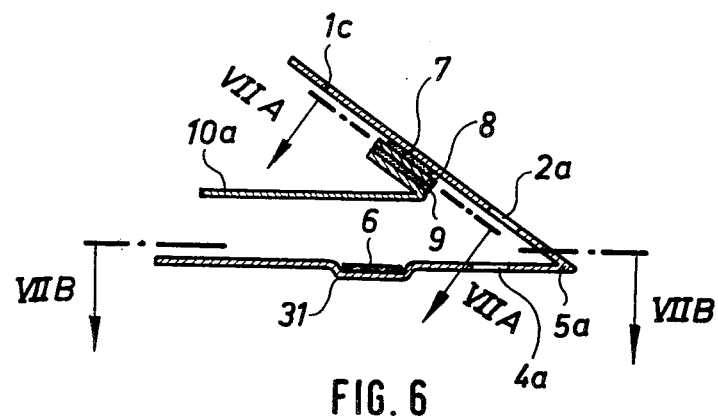
Figure 7:
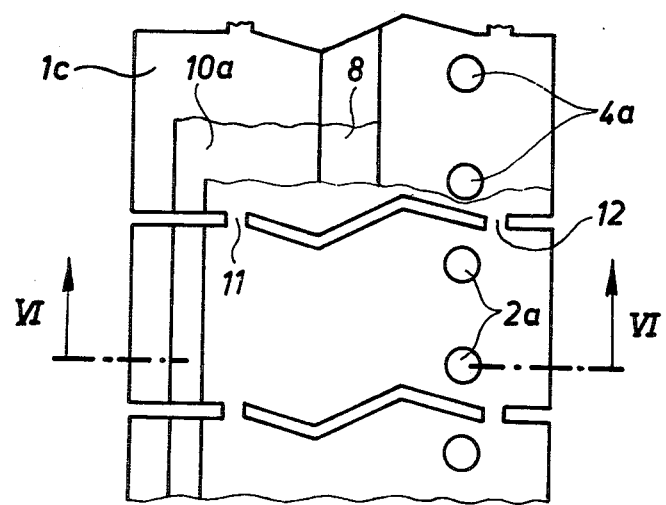

FIG. 6 shows a section along the line VI—VI in FIG. 7 of a second embodiment.

FIG. 7 is a plan view of the second embodiment with sections along the lines VIIA—VIIA and VIIB—VIIB in FIG. 6.

Figure 1:
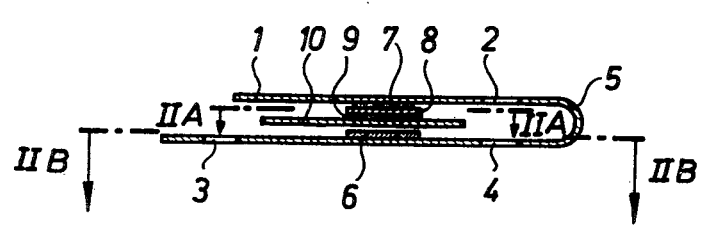
FIG. 1 shows a transverse cross section through a tape assembly in accordance with the invention along the line I—I in FIG. 2.
Figure 2:
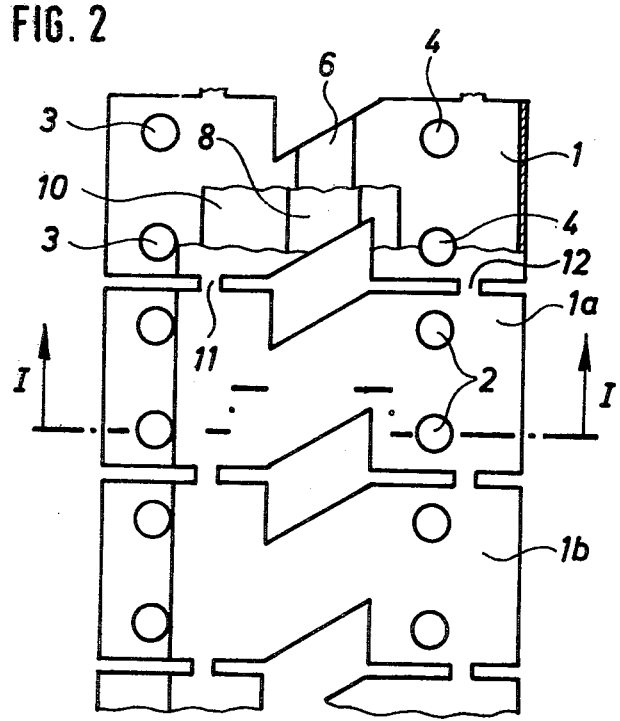
FIG. 2 is a plan view with a portion cut away, partially in section, along the lines IIA—IIA and IIB—IIB in FIG. 1.

In the diagrams, various parts are shown superimposed for the sake of clarity. The first embodiment of an adhesive tape outfit as shown in FIGS. 1 and 2 has an elongated carrying strip 1 which is bent along a line laterally offset from its middle. It has circular fixing and adjustment holes 2 to 4, all of the same diameter, arranged in pairs. The two holes 3 are located in the area of the end of the carrying strip 1 lying underneath in the diagrams and when in use, the two adjustment holes 4 are in the area 5 in the lower part of the carrying strip 1 where it bends and the two holes 2 both lie above one of the holes 4 and are coaxial with them.

At approximately the middle of the lower part of the carrying strip 1, a layer of adhesive 6 is applied which is shaped like a strip. It has low adhesive power and serves to hold in the desired position the two ends of magnetic tape that have been brought together and are to be fastened together, but neither all nor a part of this layer of adhesive continues to adhere to them.

Above the layer of adhesive 6, a layer of adhesive 7 is applied to the upper part of the carrying strip 1 on the side of it that is opposite the lower part. A strip-shaped piece of adhesive foil 8 is fastened to the carrying strip 1 with the layer of adhesive 7 in such a way that it can be detached, but neither all nor a part of the layer of adhesive 7 continues to adhere to the adhesive foil 8. On the side of the adhesive foil 8 that is away from the layer of adhesive 7, it has a layer of adhesive 9 which adheres firmly to the adhesive foil 8 and provides a firm bond between the adhesive foil 8 and the part of one of the magnetic tapes 28 shown in FIG. 5 that is covered by it. The layer of adhesive 9 is covered by a covering strip 10 projecting beyond adhesive 9 on both sides which can be removed easily from the layer of adhesive 9. When the carrying strip 1 is folded together, the covering strip 10 can adhere slightly to the layer of adhesive 6. However, it adheres more firmly to the layer of adhesive 9 of the adhesive foil 8.

As can be seen from FIG. 2, carrying strips 1, 1a, and 1b are arranged with their long sides next to each other, and are connected with each other by interconnecting pieces 11 and 12 which are located on opposite sides of the layer of adhesive 7. Additionally, or alternatively, the carrying strips can be joined by similar interconnecting pieces 11 and 12, not visible in FIG. 2, located on opposite sides of the layer of adhesive 6. As will be recognized, the interconnecting pieces 11, on opposite sides of layers 7 and 8 are aligned with the pieces 11 and 12 on the lower layer on opposite sides of layer 6 in FIG. 2 so that the latter are not visible. The adhesive foil 8 is interrupted by oblique cuts so that each end of each portion of the foil has oblique ends. The carrying strip 1 and the covering strip 10 have corresponding oblique cuts, as is shown in FIG. 2.

The adhesive tape accessories including carrying strips 1, 1a, 1b . . . are produced by punches from tapes joined together as in FIG. 1.

FIGS. 3 through 5 show a device for handling the adhesive tape accessories. The device has a base plate 21 with two stationary guide pins 22 and 22a for receiving the carrying strip 1 with one of the pins passing through each of the holes 4 and two lock pins 23 and 23a for receiving the covering strip 1 with one of pins 23 and 23a passing through each of the holes 3. The lock pins 23, 23a, each of which has an annular groove near its end, project upwardly above the upper surface of the base plate 21. Each of pins 23 and 23a is received in a slot 24 so that the pins are movable at right angles to the line connecting the two guide pins 22 and 22a. Lengthwise of each slot 24 and perpendicular to the axis of each slot, a sliding pin 25 is positioned axially movably in a drilled hole 26 in the base plate 21. Between the sliding pin 25 and the bottom of the drilled hole 26, a spring 27 is inserted which urges the sliding pin 25 toward the lock pin 23 and thereby urges pin 23 or 23a toward the wall portion of the slot 24 that is farthest away from the sliding pin 25. The pins 22, 22a, 23, 23a are located so as to define the corners of a rectangle. At about the middle of the two long sides of this imaginary rectangle, there are grooves in the base plate 21 running outside of and at right angles to its long sides to receive the ends of the magnetic tape 28.

To connect two ends of a magnetic tape 28, the adhesive tape carrying strip and foil assembly is placed as shown in FIG. 3 on the base plate of the stretching device 21, with the holes 3 of the carrying strip 1 being fitted over the lock pins 23, 23a, each of which has an annular groove. By pulling on the carrying strip 1 in the direction of the guide pins 22, 22a, the holes 4 of the carrying strip 1 can be fitted over these guide pins. The part of the carrying strip that has the layer of adhesive 6, which is located between the pins 22, 22a, 23, 23a, is stretched by this means. The two ends of the parts of the magnetic tape 28 to be fastened together are then inserted into the grooves located at the sides of the base plate 21 in such a way that the ends of the magnetic tape overlap and the lower end is still connected to the layer of adhesive 6, but scarcely adhering. Then the two ends of the magnetic tape 28 which are overlapping each other are deliberately cut obliquely at the same time with scissors or something of the sort, so that the ends of the magnetic tape 28 lie together, facing each other, when placed on the layer of adhesive 6.

The raised part of the carrying strip 1, which carries the adhesive foil 8, is then bent at the place 5 where it bends in such a way that the holes 2 engage with the guide pins 22, 22a. Then the covering strip 10 is removed, after the free end of the carrying strip 1 has been turned up slightly, and the carrying strip 1 is moved in the direction of the two ends of the magnetic tape 28 in such a way that the adhesive foil 8 covers up the two ends of the magnetic tape 28 and the layer of adhesive 9 is fastened to it, adhering firmly. The carrying strip 1 is then raised at its free end and removed from the adhesive foil foil 8 along with the layer of adhesive 7, which continues to adhere to strip 1. Then the magnetic tape 28 is removed from the carrying strip 1, to which the layer of adhesive 6 continues to adhere. When the carrying strip has been taken away from the device, the latter can be used to connect two other magnetic tape ends again in the same way.

The second embodiment, shown in FIGS. 6 and 7, can be used with an element that has a groove in which the magnetic tape 28 can be laid but no other device for fastening the carrying strip, which here is designated 1c. This carrying strip has a projection 31 which projects downward and fits into the groove, and it is inserted into the groove. The layer of adhesive 6 is located in the hollow upper part of the groove-shaped projection 31. The adhesive foil 8 is fastened to the carrying strip 1c by means of the layer of adhesive 7 in the same way as in the first embodiment, and it carries the layer of adhesive 9 which is capable of adhering to the magnetic tape. That layer is covered by a covering strip 10a, which is bent into a V or V shape, and one leg of the bent strip is adhered to the layer of adhesive 9. The bend in strip 10a points in the same direction as the bend 5a in carrying strip 1c and the leg of the covering strip which is not adhered to layer 7 extends back across the adhesive layer toward the open side of bent carrying strip 1c. Holes 2a and 4a, in the area of the bend location 5a and arranged one above the other, which can be located at the same places as the holes 2 and 4 of the first embodiment, serve to permit alignment the two parts of the carrying strip 1a that lie one above the other.

The adhesive tape assembly shown in FIGS. 6 and 7 is laid, folded, with its projection 31 in the groove for receiving the ends of the magnetic tape 28 in order to connect two ends of a magnetic tape. The ends of the magnetic tape are cut as described earlier and connected with the layer of adhesive 6. The carrying strip 1a is then bent around its bend location 5a in such a way that the holes 2a and 4a that correspond to each other lie one exactly above the other. As a result, the adhesive foil 8 is located exactly above the ends of magnetic tape to be joined together. After the covering strip 10a is pulled off, the adhesive foil 8 is pressed onto the ends of the magnetic tape 28 and fastened to them firmly. The magnetic tape 28 is then detached from the covering strip 1a.

Instead of the adjustment holes 2a, 4a, other adjustment devices such as projections or notches can be used. As far as anything else is concerned, the second embodiment corresponds to the first embodiment.

I claim:

1. An assembly for adhesively joining two ends of a soft and pliable tape, especially a magnetic tape, comprising a carrying strip having a substantially linear fold region permitting said strip to be folded generally in a U shape;

a first layer of adhesive on a limited zone of an inwardly facing major surface of said carrying strip;

a foil having one surface thereof releasably adhered to said first layer of adhesive;

a second layer of joining adhesive on the other surface of said foil;

a covering strip covering and releasably adhered to said joining adhesive; and means on said carrying strip defining an alignment mark with which the two ends of the tape to be joined and said foil can be aligned when said carrying strip is folded over upon itself, said alignment mark being located on the same major surface of said carrying strip as said first layer of adhesive and spaced therefrom with said fold region therebetween, wherein said covering strip can be removed from said joining adhesive, said joining adhesive and foil can be pressed onto the aligned tape ends and said carrying strip and first layer of adhesive can be removed from said foil.

2. An assembly according to claim 1 wherein said foil has obliquely cut ends.

3. An assembly according to claim 1 and including a plurality of carrying strips arranged one after the other and fastened to each other by interconnecting crosspieces in the form of a tape.

4. An assembly according to claim 1 wherein said carrying strip further comprising means for determining proper alignment of the folded portions of said carrying strip with each other.

5. An assembly according to claim 4 wherein said means for determining proper alignment comprises two holes locatable one above the other and coaxially alignable.

6. An assembly according to claim 4 wherein said means for determining proper alignment comprises two identical notches, each having a component parallel to said foil.

7. An assembly according to claim 4 wherein said means for determining proper alignment includes openings for receiving a stationary adjustment pin.

8. An assembly for adhesively joining two ends of a soft and pliable tape, especially a magnetic tape, comprising a carrying strip having a substantially linear fold region permitting said strip to be folded generally in a U shape;

a first layer of adhesive on a limited zone of an inwardly facing major surface of said carrying strip;

a foil having one surface thereof releasably adhered to said first layer of adhesive;

a second layer of joining adhesive on the other surface of said foil;

a covering strip covering said releasably adhered to said joining ashesive; and means on said carrying strip defining an alignment mark with which the two ends of the tape to be joined and said foil can be aligned when said carrying strip is folded over upon itself, said alignment mark being located on the same major surface of said carrying strip as said first layer of adhesive and spaced therefrom with said fold region therebetween, said alignment mark comprising a third layer of adhesive fixedly adhered to said carrying strip, the tape ends being releasably adherable to said third layer to maintain alignment thereof, said carrying strip further comprising means for determining proper alignment of the folded portions of said carrying strip with each other, whereby said covering strip can be removed from said joining adhesive, said joining adhesive and foil can be pressed onto the aligned tape ends and said carrying strip and first layer of adhesive can be removed from said foil.

9. An assembly for adhesively joining two ends of a soft and pliable tape, especially a magnetic tape, comprising a carrying strip having a substantially linear fold region permitting said strip to be folded generally in a U shape;

a first layer of adhesive on a limited zone of an inwardly facing major surface of said carrying strip;

a foil having one surface thereof releasably adhered to said first layer of adhesive;

a second layer of joining adhesive on the other surface of said foil;

a covering strip covering and releasably adhered to said joining adhesive; and means on said carrying strip defining an alignment mark with which the two ends of the tape to be joined and said foil can e aligned when said carrying strip is folded over upon itself, said alignment mark being located on the same major surface of said carrying strip as said first layer of adhesive and spaced therefrom with said fold region therebetween, said alignment mark comprising a depression for receiving the soft and pliable tape, said carrying strip further comprising means for determining proper alignment of the folded portions of said carrying strip with each other, whereby said covering strip can be removed from said joining adhesive, said joining adhesive and foil can be pressed onto the aligned tape ends and said carrying strip and first layer of adhesive can be removed from said foil.

* * * * *